United States Patent
DeVille

(10) Patent No.: US 11,492,539 B1
(45) Date of Patent: Nov. 8, 2022

(54) ACID GENERATION FOR FILTERCAKE REMOVAL IN SUBTERRANEAN APPLICATIONS

(71) Applicant: Halliburton Energy Services, Inc., Houston, TX (US)

(72) Inventor: Jay DeVille, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 17/513,205

(22) Filed: Oct. 28, 2021

(51) Int. Cl.
*E21B 37/00* (2006.01)
*C09K 8/528* (2006.01)

(52) U.S. Cl.
CPC ............ *C09K 8/528* (2013.01); *E21B 37/00* (2013.01)

(58) Field of Classification Search
CPC ................................ C09K 8/528; E21B 37/00
See application file for complete search history.

(56) References Cited

U.S. PATENT DOCUMENTS

| | | |
|---|---|---|
| 3,938,593 A | 2/1976 | Friedman |
| 4,148,360 A | 4/1979 | Watanabe |
| 4,203,492 A | 5/1980 | Watanabe |
| 4,261,421 A | 4/1981 | Watanabe |
| 4,267,887 A | 5/1981 | Watanabe |
| 4,739,833 A | 4/1988 | Watanabe et al. |
| 5,002,128 A | 3/1991 | Wiseman, Jr. |
| 5,158,139 A | 10/1992 | Lau |
| 5,168,930 A | 12/1992 | Wiseman et al. |
| 5,354,786 A | 10/1994 | Lau |
| 6,877,563 B2 | 4/2005 | Todd et al. |
| 7,906,464 B2 | 3/2011 | Davidson |
| 3,030,251 A1 | 10/2011 | Todd et al. |
| 9,562,425 B2 | 2/2017 | Nguyen et al. |
| 10,815,414 B2 * | 10/2020 | Panga ............... C09K 8/665 |
| 11,098,237 B1 | 8/2021 | Zhou et al. |
| 2004/0182576 A1 * | 9/2004 | Reddy ............... C09K 8/685 166/279 |
| 2014/0138092 A1 * | 5/2014 | Reddy ............ C04B 40/0641 166/300 |
| 2015/0232744 A1 * | 8/2015 | Beuterbaugh ....... C09K 8/703 507/202 |

FOREIGN PATENT DOCUMENTS

WO 2021137869 7/2021

* cited by examiner

*Primary Examiner* — Silvana C Runyan
(74) *Attorney, Agent, or Firm* — Tenley Krueger; C. Tumey Law Group PLLC

(57) ABSTRACT

A variety of methods, systems, and compositions are disclosed, including, in one embodiment, a method of servicing a borehole including providing a borehole servicing fluid in a borehole penetrating a subterranean formation, wherein the borehole servicing fluid includes a nucleophilic organic molecule and an electrophile. The method further may include reacting the nucleophilic organic molecule and the electrophile to generate at least an acidic species. The method further may include contacting an acid-soluble component in the subterranean formation with the acidic species such that the acidic species degrades the acid-soluble component.

22 Claims, 4 Drawing Sheets

ACID GENERATION FOR FILTERCAKE REMOVAL IN SUBTERRANEAN APPLICATIONS

BACKGROUND

Natural resources such as gas, oil, and water residing in a subterranean formation or zone are usually recovered by drilling a borehole down to the subterranean formation while circulating a drilling fluid in the borehole. During the drilling operation, a drilling fluid, also referred to as drilling mud, is conventionally circulated through the borehole as the borehole is drilled. The drilling mud aids in the drilling operation, for example, by removing cuttings from the borehole, (e.g., by suspending cuttings for return to the surface), controlling pressures within the subterranean formation, sealing permeable and/or semi-permeable portions of the subterranean formation, stabilizing the subterranean formation, cooling and lubricating the drilling apparatus, and facilitating completion operations.

As the drilling mud is circulated through the borehole, solid components of the drilling mud are deposited on the surfaces of the borehole in a layer known as a "filtercake," thus inhibiting the loss of mud or other borehole fluids to the formation during the drilling and/or other servicing operations. The composition of the filtercake varies with the drilling fluid and may include a biopolymer such as starch, xanthan gum, cellulose, guar gum, and derivatives thereof, which acts as a viscosifier or a fluid loss control additive; and a bridging agent such as calcium carbonate to aid in preventing or reducing loss of drilling fluid into the formation.

Prior to production, the filtercake can be removed to allow the unimpeded flow of natural resources into the borehole from the formation. This can be accomplished by contacting the filtercake with an aqueous acid solution. However, the use of an aqueous acid solution is hazardous to personnel and often causes tubular goods and the like to be corroded. Also, the aqueous acid solution can react rapidly at the initial point of contact with the well bore thereby creating a fluid loss zone into which the rest of the acid is lost leaving much of the filtercake untouched and in place. Thus, there are needs for improved clean-up solutions for removing filtercakes from surfaces in the borehole.

BRIEF DESCRIPTION OF THE DRAWINGS

These drawings illustrate certain aspects of some of the embodiments of the present disclosure and should not be used to limit or define the disclosure.

DETAILED DESCRIPTION

Figure 1:
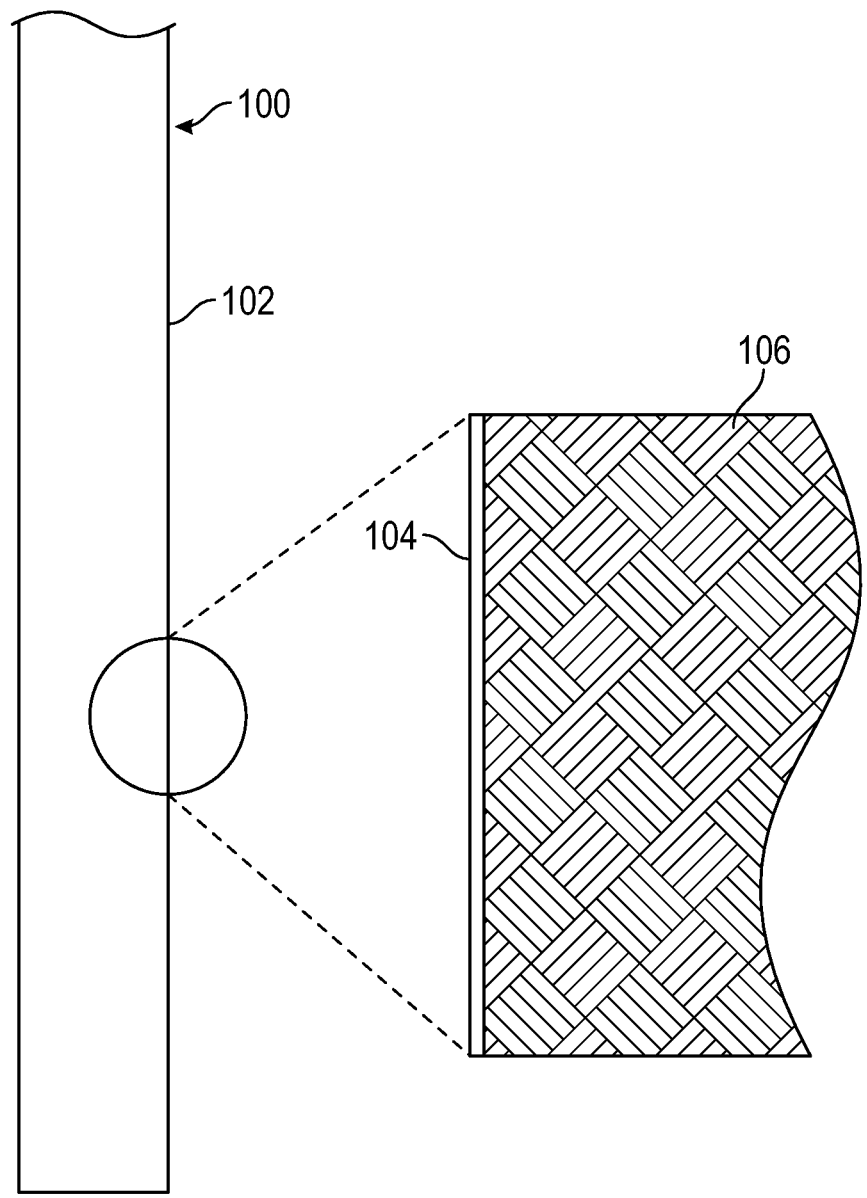
FIG. 1 illustrates a borehole with a filtercake formed on a subterranean formation in accordance with some embodiments of the present disclosure.

Disclosed herein are techniques for acid generation in subterranean applications and, more particularly, one or more embodiments include generation of an acid in a borehole for filtercake removal.

The acid may be generated through the reaction of a nucleophilic organic molecule and an electrophile that result in production of acid byproducts. Advantageously, the acid can be generated without relying on water-mediating hydrolysis reactions and, thus, does not require water. However, water can be used as the nucleophilic organic molecule in accordance with one or more embodiments. Not using (or minimizing) water in the subterranean applications can have a number of benefits. For example, the acid may be effective at removing filtercakes from non-aqueous drilling fluids (e.g., invert emulsions) or in water-sensitive formations (e.g., high clay content) due the minimization of water. In addition, acids generated may include strong acids, which can be more effective at filtercake removal than other acids, such as formic and lactic acid, that can be generated downhole.

The acid generated through the reaction of the reaction of a nucleophilic organic molecule and an electrophile may be used for any suitable subterranean application, including filtercake removal. The buildup of solid particulate or other fluid-loss control material on the walls of a borehole or a fracture is referred to as a filtercake. Such a filtercake can help block the further loss of a fluid phase (referred to as a filtrate) into the subterranean formation. Filtercakes can include a number of acid-soluble components whose removal may facilitated by the acid. Examples of acid-soluble components in the filtercake include calcium carbonate, magnesium oxide, magnesium carbonate, iron carbonate, and/or manganese tetraoxide. Filtercakes may also include acid-degradable polymeric materials. Additional subterranean application where acid generation may be desired, include carbonate acidizing and scale removal, among other. Even further, additional reaction products of the reaction of the nucleophilic organic molecule with the electrophile may include esters (e.g., acetate esters). In one or more embodiments, the esters may be hydrolyzed, for example, in the presence of water, to form additional acid (e.g., acetic acid), wherein this additional acid can also react with the acid-soluble components.

The acid may contact and react with the acid-soluble components in the subterranean formation, thereby facilitating removal of the acid-soluble components. For example, the acid may contact a filtercake such that the acid reacts with one or more acid-soluble components of the filtercake. By reacting with and ultimately degrading the acid-soluble components of the filtercake, the filtercake may be broken and removed from the borehole walls.

The nucleophilic organic molecule reacted to form the acid may include any suitable nucleophilic organic molecule for reaction with the electrophile. Examples of suitable nucleophilic organic molecules include water, simple alcohols, or mutual solvents terminated in a hydroxy group. A wide variety of simple alcohols may be used, including, methanol, ethanol, and propanol (e.g., isopropyl alcohol), among others. A wide variety of mutual solvents that terminate in a hydroxy group may be used, including glycol ethers (e.g., ethylene glycol monomethyl ether (EGMBE), diethylene glycol monobutyl ether, triethylene glycol monobutyl ether, tetraethylene glycol monobutyl ether, etc.) and alcohol ethers. Other suitable nucleophilic organic molecules may include amines, thiols, carboxylic acids, and phosphorous-based organics (e.g., phosphines).

The electrophile reacted to form the acid may include any suitable electrophile for reaction with the nucleophilic organic molecule. Suitable electrophiles may include alkylating agents that are reactive and attach to alkyl groups of the nucleophilic organic molecule. In some embodiments, the electrophile may include a halide leaving group, such as fluorine, chlorine, bromine, or iodine, for example. In some embodiments, the electrophile may include a sulfonate leaving group, for example, in the generation of sulfonic acid. Examples of suitable electrophiles include acid anhydrides, acid halides (e.g., acid chlorides), alkyl halides, or other suitable alkylating agents. Reaction of the acid halide with the nucleophilic organic molecular, for example, may result in formation of a strong acid. Where used, the acid anhydride can include at least one of a carboxylate, a sulfonate, sulfate, a phosphate, and a phosphonate group. Examples of suitable acid anhydrides include phthalic anhydride, formic anhydride, acetic anhydride, maleic anhydride, acetic formic anhydride, a (Ci-C2o) alkanoic (Ci-C2o) alkanoic anhydride, propanoic acid anhydride, butanoic acid anhydride, pentanoic acid anhydride, hexanoic acid anhydride, octanoic acid anhydride, nonanoic acid anhydride, decanoic acid anhydride, salicylic acid anhydride, acrylic acid anhydride, aspartic acid anhydride, fumaric acid anhydride, methacrylic acid anhydride, hydroxypropyl acrylic acid anhydride, vinyl phosphonic acid anhydride, vinylidene diphosphonic acid anhydride, maleic anhydride, itaconic acid anhydride, crotonic acid anhydride, maleic acid anhydride, mesoconic acid anhydride, citraconic acid anhydride, styrene sulfonic acid anhydride, allyl sulfonic acid anhydride, methallyl, sulfonic acid anhydride, and vinyl sulfonic acid anhydride. Examples of suitable acid chlorides include acetyl chloride, formyl chloride, benzoyl chloride, propanoyl chloride, butyryl chloride, oxalyl chloride, malonyl chloride, succinyl chloride, glutaryl chloride, adipoyl chloride. Suitable alkyl halides can include a halogen atom, such as fluorine, chlorine, bromine, or idodine) and an alkyl group. The alkyl group can have, for example, from 1 carbon to 18 carbons. Specific examples of alkyl halides include methyl halide, ethyl halide, propyl halide, butyl halide, benzyl halide, and cyclohexyl halide, among others.

Alternatively, the nucleophilic organic molecule and/or electrophile can be polyfunctional. Where a polyfunctional nucleophilic organic molecule and/or polyfunctional electrophile is used, embodiments may generate more moles of the acid.

The acid generated by particular nucleophilic organic molecule and electrophile selected for use. Examples of suitable acids that can be generated include strong mineral acids, such as hydrochloride acid, hydrobromic acid, hydroiodic acid, and sulfuric acid, among others. Additional acids that can be generated include sulfonic acid, carboxylic acid, acetic acid, methanesulfonic acid, p-toluenesolfonic acid, trifluoroacetic acid, and trifluormethanesulfonic acid. While the preceding description descriptions formation of an acid, it should be understood that embodiments may generate an acidic species, such as a protonated intermediate that itself reacts with the acid-soluble components. As used herein, the term "acidic species" refers to acids and other molecules, such as protonated intermediates, that have a pKa in water of less than 6. Selection of the particular acid may depend on a number of factors, including filtercake composition and downhole temperatures.

Suitable reactions may include nucleophilic addition and nucleophilic substitution reactions. Reaction 1 below illustrates an example of a nucleophilic addition reaction of a mutual solvent with an acid chloride.

Reaction 1

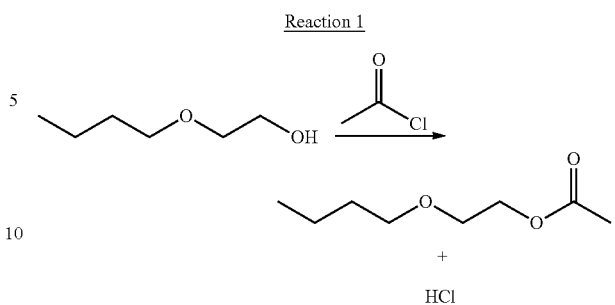

In the example of Reaction 1, the mutual solvent includes EGMBE that is reacted with acetyl chloride (an acid chloride) to form the acetate ester of EGMBE and hydrogen chloride. As previously described, the generated hydrogen chloride can be used to react with acid-soluble components, for example, to degrade filtercakes. Even further, the acetate ester may be hydrolyzed to form additional acid.

Reaction 2 below illustrates an example of a nucleophilic addition reaction of a mutual solvent with an acid anhydride.

Reaction 2

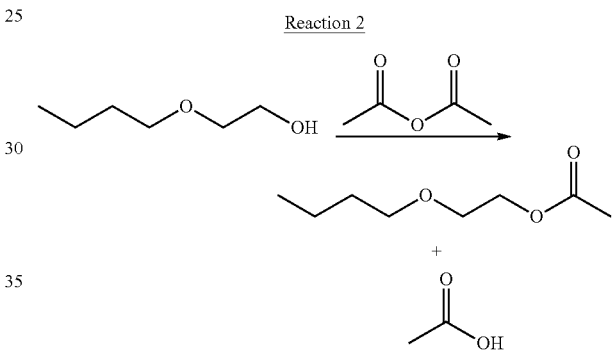

In the example of Reaction 2, the mutual solvent includes EGMBE that is reacted with acetyl anhydride (an acid anhydride) to form the acetate ester of EGMBE and acetic acid. As previously described, the generated acetic acid can be used to react with acid-soluble components, for example, to degrade filtercakes. Even further, the acetate ester may be hydrolyzed to form additional acid.

Reaction 3 below illustrates an example of a nucleophilic substitution reaction of a mutual solvent with an acid halide.

Reaction 3

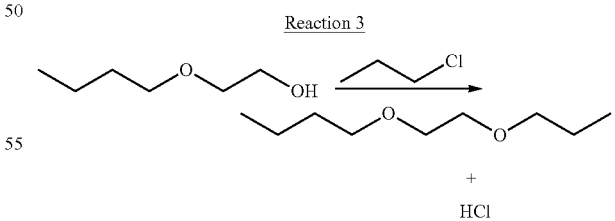

In the example of Reaction 3, the mutual solvent includes EGMBE that is reacted with propyl chloride (an acid halide) to form the propyl ether of EGMBE and hydrochloric acid. As previously described, the generated hydrochloride acid can be used to react with acid-soluble components, for example, to degrade filtercakes.

While Reactions 1 to 3 illustrate reaction of the mutual solvent with various electrophiles, it should be understood that water or other nucleophilic organic molecules can be used in place of the mutual solvent for reaction with electrophile. Examples of suitable electrophiles and nucleophilic organic molecules are described herein.

Reaction 4 below illustrates an example reaction of a mutual solvent with an acid chloride.

Reaction 4

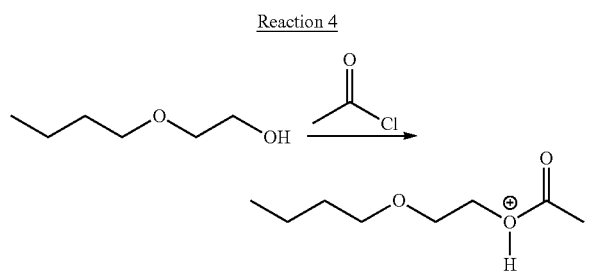

In the example of Reaction 4, the mutual solvent includes EGMBE that is reacted with acetyl chloride (an acid chloride) to form an acidic species that is a protonated intermediate. As previously described, the generated acidic species can be used to react with acid-soluble components, for example, to degrade filtercakes.

Embodiments may include delaying the reaction of the nucleophilic organic molecule with the electrophile to thereby delay acid generation. Any of a variety of suitable techniques may be used for delaying the reaction, including modifying the structures of the nucleophilic organic molecules. In some embodiments, the nucleophilic organic molecule and/or electrophile may be modified to lower their reactivity toward the other reactor, for example, making the nucleophilic organic molecule less nucleophilic or the electrophilic less electrophilic. A slow reaction should result in delayed acid production. For example, the nucleophilic organic molecule can be modified to be less nucleophilic by incorporation of electron withdrawing groups that withdraw electron density. By way of further example, the electrophile can be modified to be less electrophilic by incorporation of electron donating groups that donate electron density.

Another example technique for modifying the nucleophilic organic molecules and/or electrophiles to reduce their reactivity includes increasing the steric bulk around the reactive sites. Steric effects are nonbonding interactions that influence the shape and reactivity of ions and molecules. In one or more aspects, the nucleophilic organic molecules and/or the electrophiles are sterically hindered molecules. Steric hindrance refers to the finding that at a given atom in a molecule, there can be a congestion caused by the physical presence of the surrounding atoms Steric hindrance may slow down or prevent reactions at the sterically-hindered atom. In some embodiments, the nucleophilic organic molecules and/or the electrophiles include at least one R group with A-values greater than about 1.76 kcal/mol, alternatively greater than about 1.78 kcal/mol or alternatively greater than about 2 kcal/mol. "A-Values" are a numerical way of rating the bulkiness of substituents on a cyclohexane ring. The "A-Value" represents the difference in energy (in kcal/mol) between a cyclohexane conformation bearing a group in an equatorial position and a cyclohexane conformation bearing the group in an axial position. The greater the "A-value," the higher the energetic preference for the equatorial position of the cyclohexane ring, and the more "bulky" the group is considered.

In addition to modifications, an additional technique for delaying the reaction of the nucleophilic organic molecule with the electrophile may include on the fly mixing. As used herein, on the fly mixing refers to introduction of a flowing stream into another flowing stream so that the streams are combined and mixed while continuing to flow as a single stream. For example, a stream including the nucleophilic organic molecule can be combined with a stream including the electrophile so that the two are streams are mixed while continuing to flow as a single stream. The two streams can then mix as they are being pumped downhole.

Another technique for delaying the reaction of the nucleophilic organic molecule with the electrophile may include delaying release of one or both of the nucleophilic organic molecule and/or electrophile into borehole servicing fluid. Delayed release may include coating the nucleophilic organic molecule and/or electrophile. For example, the nucleophilic organic molecule and/or electrophile may be coated (e.g., a polymeric coating, resin coating, etc.) to delay the release of the nucleophilic organic molecule and/or electrophile into the borehole servicing fluid. In additional examples, delayed release may include adsorbing one or both of the nucleophilic organic molecule and/or electrophile onto a substrate such that its release into the borehole servicing fluid may be delayed.

Embodiments may include placing into a borehole a borehole servicing fluid including a nucleophilic organic molecule and an electrophile. The nucleophilic organic molecule may be included in the borehole servicing fluid in any suitable amount. For example, the nucleophilic organic molecule may be included in the borehole servicing fluid in an amount of about 5% to about 25% by volume of the borehole servicing fluid and, alternatively, in an amount of about 10% to about 20% by volume of the borehole servicing fluid. The electrophile may be included in the borehole servicing fluid in any suitable amount. For example, the electrophile may be included in the borehole servicing fluid in an amount of about 5% to about 25% by volume of the borehole servicing fluid and, alternatively, in an amount of about 10% to about 20% by volume of the borehole servicing fluid.

The borehole servicing fluid can include a base fluid. Suitable base fluids may include an aqueous fluid or a non-aqueous fluid. Examples of the aqueous fluid include fresh water, salt water, and brines, among others. As previously described, the nucleophilic organic molecule may include water such that the nucleophilic organic molecule may be the base fluid, in some embodiments. Examples of non-aqueous fluids include mineral oils, synthetic oils, esters, kerosene, xylene, toluene, diesel, and oils, among others. The base fluid may be included in the borehole servicing fluid in any suitable amount. For example, the base fluid may be included in an amount of from about 50 wt. % to about 95 wt. % based on the total weight of the borehole servicing fluid, alternatively from about 55 wt. % to about 95 wt. % or alternatively from about 55 wt. % to about 93 wt. %.

The borehole servicing fluid may optionally include one or more of any additives that may be suitable as desired by those ordinary skill in the alt Examples of such additional additives include, but are not limited to, corrosion inhibitors, gelling agents breakers, and surfactants. Corrosion inhibitors may be used, for example, to prevent corrosion of metal tubulars and the like. Examples of corrosion inhibitors that can be used include, but are not limited to, acetylenic acid derivatives, polymeric mines/polyoxyethylene mixtures and mixtures of amines and thio compounds. Gelling agent breakers may be used, for example, for reducing the 'viscosity' of gelling agents in the filtercake. Examples of gelling agent breakers Which can be used in the clean-up fluid include, but are not limited to, encapsulated oxidizing agents and enzymes such as alpha amylase (degrades starch), beta amylase (degrades cellulose) and lipase (degrades other gelling agents). Surfactants can be used, for example, for water wetting oil wet solids in the filtercake. Examples of surfactants that can be used include, but are not limited to, non-ionic surfactants such as ethoxylated fatty alcohols and alkoxylated fatty alcohol derivatives.

Prior to acid generation, the borehole servicing fluid can have any suitable pH, for example, a pH in a range of from about 7 to about 10, alternatively from about 7 to about 9.5 or alternatively from about 7 to about 9. The pH of the borehole servicing fluid can decrease as the acid may be generated in the borehole.

Examples of the borehole servicing fluids as described herein can be prepared using any suitable method. In some methods, the method includes placing a mixture of components (e.g., a nucleophilic organic molecule, electrophile, base fluid, and/or one or more additional additives) of the borehole servicing fluid into a suitable container (e.g., a mixer, a blender) and blending the mixture until the mixture becomes a pumpable fluid (e.g., a homogeneous fluid). In some embodiments, the nucleophilic organic molecule and electrophile may be combined on the fly as previously described.

Examples of the borehole servicing fluids as described herein may be used for the removal of filtercakes in any suitable stage of a borehole's life, such as for example, during a drilling operation, completion operation, etc. In some embodiments, a method of servicing a borehole penetrating a subterranean formation can include drilling the borehole with a drilling fluid and forming a filtercake over at least a portion of the borehole. The borehole servicing fluid can be utilized in/after a drilling operation. In some embodiments, a drilling fluid (e.g., drilling mud) is circulated through the borehole while the borehole is drilled. The drilling fluid can be circulated down through a conduit (e.g.; a drill pipe) deposited in the borehole and back up through an annular space between an outer surface of the conduit and a borehole wall. As the drilling fluid is circulated through the borehole, a portion of the drilling fluid can be deposited on a downhole surface (e.g., borehole surface, formation surface, etc.) over at least a portion of the borehole, thereby forming a filtercake. Presence of the filtercake may inhibit the loss of the drilling fluid or other fluids into the formation and may contribute to formation control and borehole stability.

Concurrent with and/or subsequent to drifting operations where a filtercake is formed on the downhole surface (e.g., borehole surface, formation surface, etc.), a borehole servicing fluid as disclosed herein may be placed downhole. As disclosed herein, the nucleophilic organic molecule may react with the electrophile to generate an acid that is contacted with the filtercake to remove all or a portion of the filtercake. When desired (for example, upon reaching a desired depth), circulation of drilling fluid can be stopped, and the borehole servicing fluid can be placed downhole via the conduit (e.g., a drill pipe) to contact the filtercake. In some embodiments, the borehole servicing fluid is placed (e.g., injected) into the borehole such that the generated acid contacts the filtercake therein by the same pumping system utilized to circulate drilling fluid through the borehole during the drilling thereof. After the borehole servicing fluid being placed downhole, the method may further include "pull out of the hole" (POOH) procedures, in which the conduit and other downhole tools/equipment (e.g., drillstring, tubing string, wireline equipment, a measurement tool, a logging tool, etc.) are retrieved (e.g., pulled out) from the borehole to a surface of the borehole. In some embodiments, the method further includes closing a fluid isolation valve above a portion of the borehole where the borehole servicing fluid breaker fluid) has been placed. The closing of the fluid isolation valve can avoid communication of fluids above and below the fluid isolation valve so that the borehole is in a "shut-in" state.

In some embodiments, the method further includes reacting the nucleophilic organic molecule with the electrophile to form an acid and allowing the acid to remove all or a portion of the filtercake. For example, the acid can react with one or more acid-soluble components of the filtercake to degrade the filtercake. In some embodiments, when a sufficient quantity of the borehole servicing fluid has been placed within the borehole, the borehole servicing fluid may be allowed to remain in contact with the filtercake, for a sufficient period of time (e.g., for a time range disclosed herein) such that sufficient acid is generated to remove all or a portion of the filtercake. For example, in such an aspect, the borehole servicing fluid may be allowed to remain in contact with the filtercake for a soak period, for example, for a period of time of at least about 1 hour, alternatively at least about 4 hours, alternatively at least about 8 hours, alternatively at least about 16 hours, alternatively at least about 24 hours, alternatively at least about 36 hours, alternatively at least about 48 hours, alternatively at least about 60 hours, alternatively at least about 72 hours, alternatively at least about 84 hours. In an aspect, during such a "soak period," the fluids within the borehole may remain in a substantially static state, for example, as opposed to a dynamic state in which circulation may be present. In an aspect, the borehole may be shut-in (e.g., by closing the fluid isolation valve) while the borehole servicing fluid remains in contact with the filtercake (e.g., soaks the filtercake).

Following treatment with a borehole servicing fluid as disclosed herein, further servicing operations may be performed (e.g., completion and/or production operations) as desired or appropriate, as for example in a hydrocarbon-producing well. In an aspect, a suitable flushing fluid or a spacer fluid is circulated through the borehole to wash any remaining filtercake from the downhole surface. Generally, the flushing fluid utilized can be an aqueous solution which does not adversely affect the permeability of the formation. Thus, the flushing fluid may be an aqueous solution containing a relative permeability modifier.

Additional methods for using the borehole servicing fluid to remove the filtercake from a borehole and are illustrated in FIGS. 1-4 in accordance with one or more embodiments.

FIG. 1 shows a close-up view of borehole 100 having an openhole section 102 in accordance with one or more embodiments. As illustrated, the close-up view shows filtercake 104 as a layer on an openhole section 102 of the borehole 100 in a subterranean formation 106.

Figure 2:
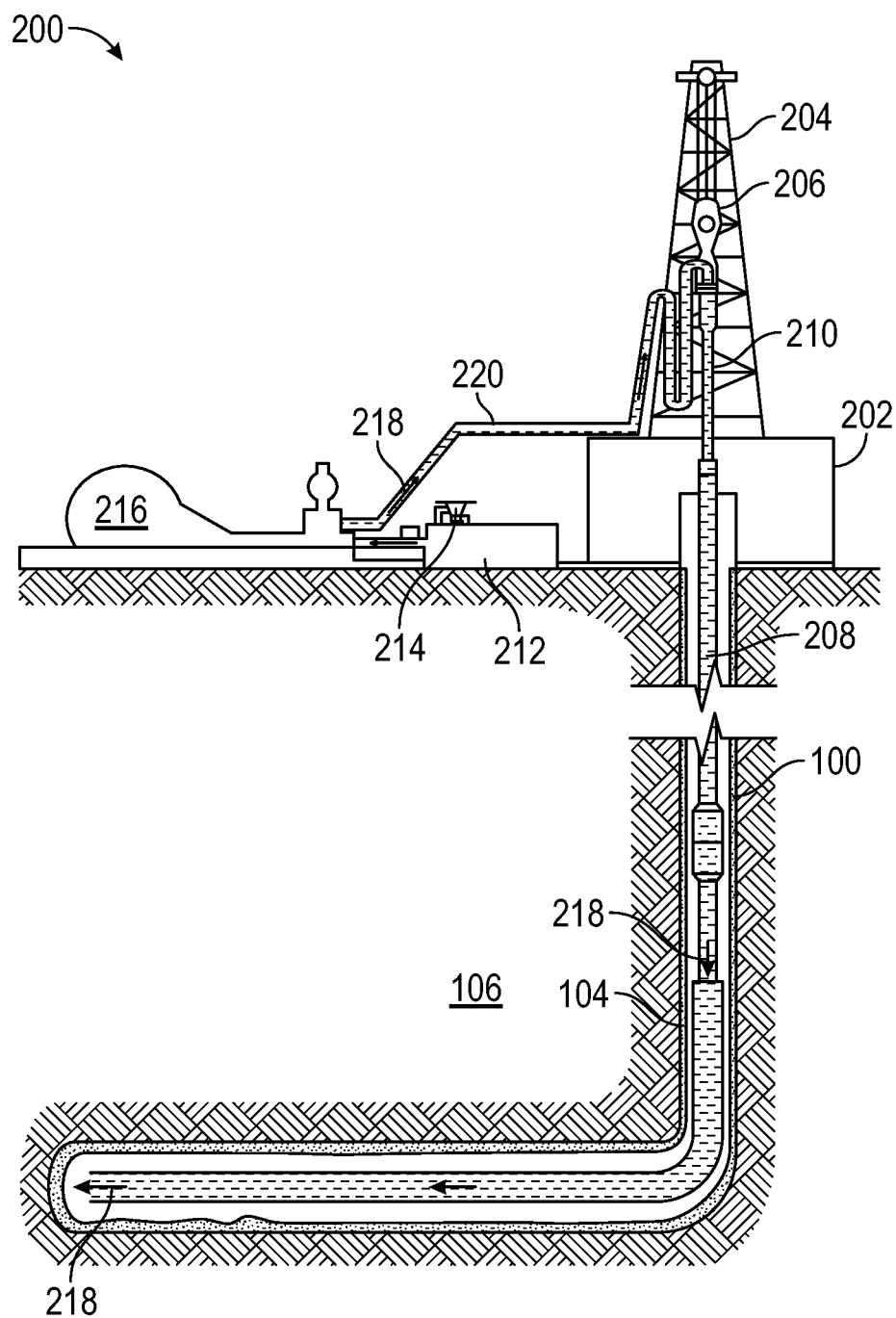
FIG. 2 illustrates a borehole in a subterranean formation that is treated in accordance with some embodiments of the present disclosure.

FIG. 2 shows a treatment system 200 that may include a platform 202 that supports a derrick 204 having a traveling block 206 for raising and lowering a work string 208. The treatment system 200 is shown as an onshore system, although a person of skill in the art with the benefit of this disclosure will recognize that the methods of the present disclosure may be applied as well to offshore production. The work string 208 may include, but is not limited to, pipe and coiled tubing, as generally known to those skilled in the art. A kelly 210 supports the work string 208 as the work string 208 is lowered below the platform 202 and into the borehole 100 that penetrates various subterranean formations 106. Borehole 100 is depicted as having a vertical section and a downhole horizontal section, although a person of skill in the art with the benefit of this disclosure will recognize that the methods of the present disclosure may be applied to boreholes of any configuration and/or orientation. A filtercake 104 is formed on the wall of borehole 100 and may have been deposited in borehole 100 in the course of a drilling operation. At a point in the borehole operations, it may become desirable to remove filtercake 104, such as to allow production of fluids from the subterranean formation 106 into the borehole 100.

To remove the filtercake 104, a borehole servicing fluid that includes a nucleophilic organic molecule and an electrophilic as disclosed herein may be prepared, such as, in one or more blender unit(s) 212. Those skilled in the art will readily appreciate that the blender unit(s) 212 may be arranged at any location in the treatment system 200 than shown, without departing from the scope of the scope of the disclosure. One or more components or additives may be added to the borehole servicing fluid in the blender unit 212 via a hopper 214 communicably coupled to or otherwise in fluid communication therewith. The hopper 214 may include, but is not limited to, bins and metering equipment known to those skilled in the art. The blender unit(s) 212 may further include one or more sensors, gauges, pumps, compressors, and the like used store, monitor, regulate, and/or condition the treatment fluid(s). A pump 216 (e.g., a mud pump) circulates the prepared borehole servicing fluid 218 through a feed pipe 220 and to the kelly 210, which conveys the composition 218 downhole through the interior of the work string 208 and through one or more orifices at a downhole end of the work string 208.

Figure 3:
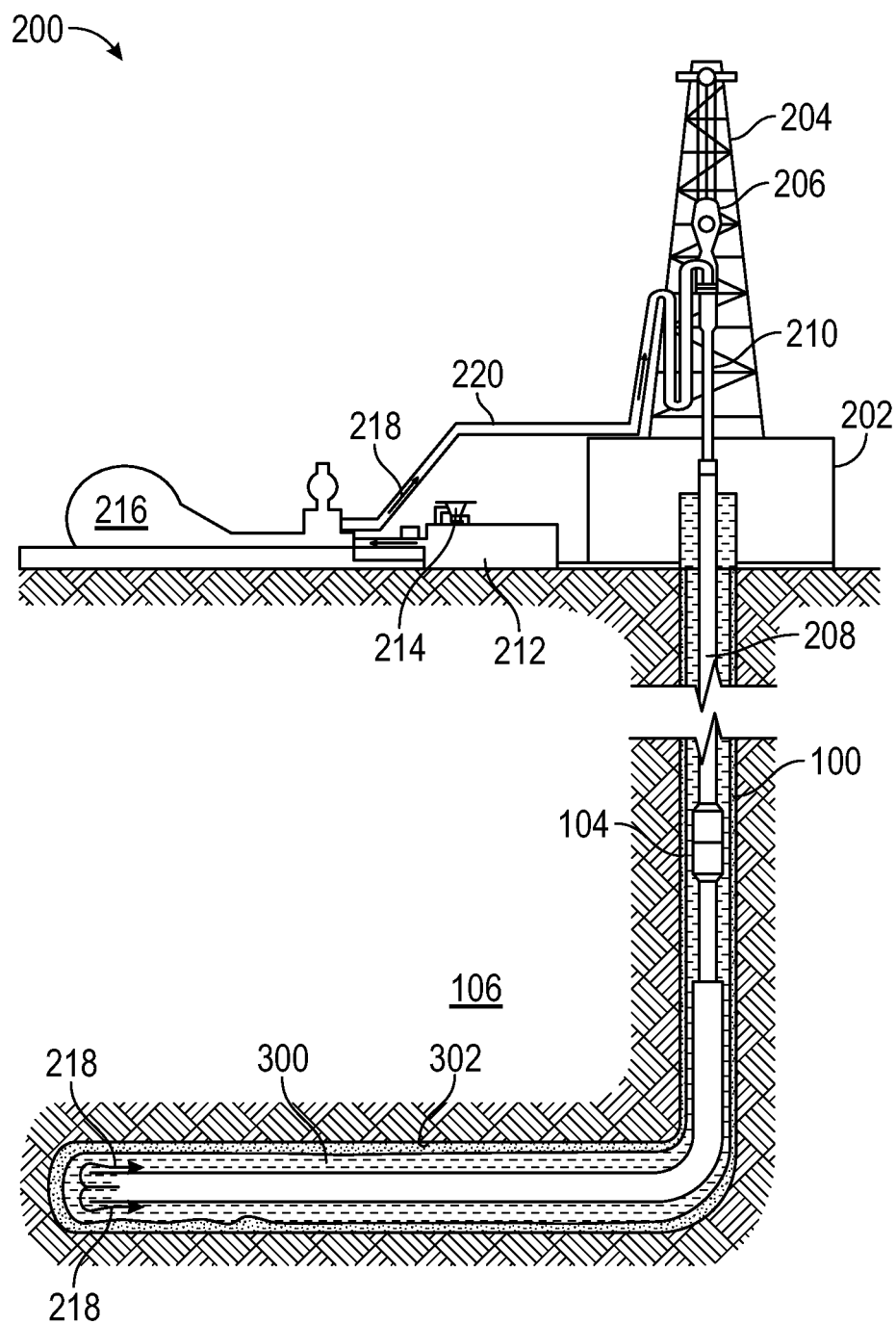
FIG. 3 illustrates the borehole in a subterranean formation of FIG. 2 at a subsequent point in time during the treatment in accordance with some embodiments of the present disclosure.
Figure 4:
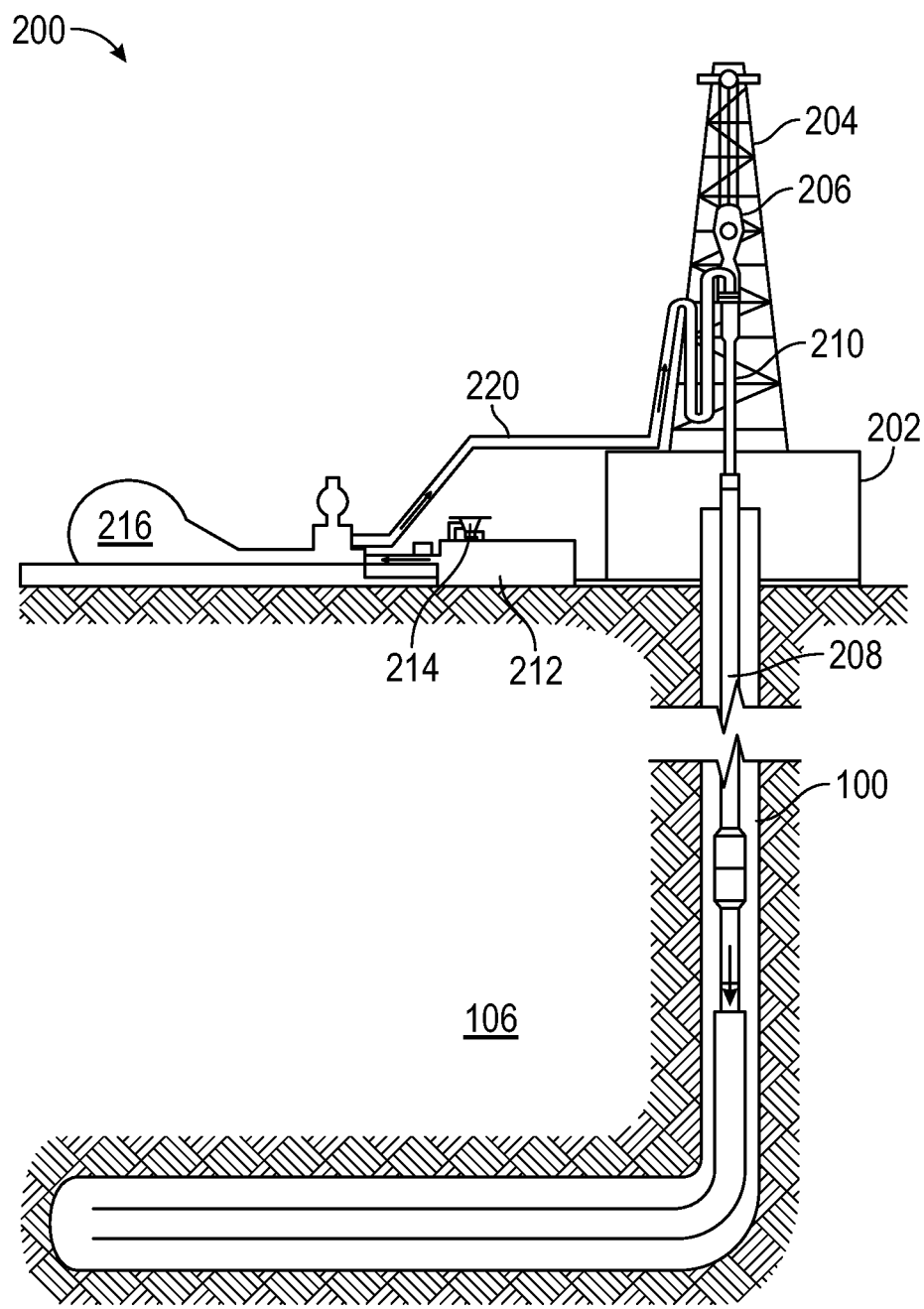
FIG. 4 illustrates the borehole in a subterranean formation of FIG. 2 following a treatment in accordance with some embodiments of the present disclosure.

As shown in FIG. 3, the borehole servicing fluid 218 then circulates into the annular region 300 between the outer surface of work string 208 and the wall 302 of borehole 100. By contacting the filtercake 104 with acid generated from reaction of the nucleophilic organic molecule with the electrophile in the borehole servicing fluid 218, the acid may degrade it, facilitating its circulation out of the borehole 100, as illustrated on FIG. 4.

Accordingly, the present disclosure may provide for downhole acid generation. The methods, systems, and compositions may include any of the various features disclosed herein, including one or more of the following statements.

Statement 1. A method of servicing a borehole include: providing a borehole servicing fluid in a borehole penetrating a subterranean formation, wherein the borehole servicing fluid includes a nucleophilic organic molecule and an electrophile; reacting the nucleophilic organic molecule and the electrophile to generate at least an acidic species; and contacting an acid-soluble component in the subterranean formation with the acidic species such that the acidic species degrades the acid-soluble component.

Statement 2. The method of statement 1, wherein providing the borehole servicing fluid includes pumping the borehole servicing fluid into the borehole.

Statement 3. The method of statement 1 or 2, wherein providing the borehole servicing fluid including combining a stream including the nucleophilic organic molecule and another stream including the electrophile to form the borehole servicing fluid.

Statement 4. The method of any preceding statement, wherein the acidic species includes at least one strong acid selected from the group consisting of hydrochloride acid, hydrobromic acid, hydroiodic acid, and sulfuric acid.

Statement 5. The method of preceding statement wherein the nucleophilic organic molecule includes at least one nucleophile selected from the group consisting of a simple alcohol, a mutual solvent, an amine, a thiol, a carboxylic acid, a phosphorous-based organic, and combinations thereof.

Statement 6. The method of any preceding statement, wherein the nucleophilic organic molecule includes a mutual solvent.

Statement 7. The method of claim 6, wherein the mutual solvent includes a glycol ether.

Statement 8. The method of any preceding statement, wherein the electrophile includes an acid halide such that the acidic species formed includes a strong acid.

Statement 9. The method of any one of statements 1-7, wherein the electrophile includes an acid anhydride.

Statement 10. The method of any one of statements 1-8, wherein the electrophile includes an alkyl halide.

Statement 11. The method of any preceding statement, wherein the nucleophilic organic molecule includes water.

Statement 12. The method of any preceding statement, wherein the electrophile includes at least one alkylating agent selected from the group consisting of an acid anhydride, an acid chloride, an alkyl halide, and combinations thereof.

Statement 13. The method of any preceding statement, wherein the borehole servicing fluid includes a non-aqueous fluid in an amount of about 50 wt. % to about 95 wt. % based on a total weight of the borehole servicing fluid.

Statement 14. The method of any preceding statement, wherein the acidic species includes a protonated intermediate that reacts with the acid-soluble component.

Statement 15. The method of any preceding statement, wherein the nucleophilic organic molecule, the electrophile, or both the nucleophilic organic molecule and the electrophile are modified to reduce reactivity with one another.

Statement 16. The method of any preceding statement, wherein the nucleophilic organic molecule and/or the electrophile are sterically hindered with at least one R group having an A-value greater than about 1.76 kcal/mol.

Statement 17. The method of any preceding statement, wherein the acid-soluble component is a component of a filtercake, and wherein acid degradation of acid-soluble component removes at least a portion of the filtercake.

Statement 18. The method of any preceding statement, further including shutting in the borehole for a period of about 1 hour or longer while the acidic species is contacting the acid-soluble component.

Statement 19. A method of servicing a borehole including: providing a borehole servicing fluid in a borehole penetrating a subterranean formation, wherein the borehole servicing fluid includes a non-aqueous fluid, a nucleophilic organic molecule, and an electrophile, wherein the non-aqueous fluid is present in an amount of about 50 wt. % to about 95 wt. % based on a total weight of the borehole servicing fluid; and wherein the nucleophilic organic molecule includes a mutual solvent; reacting the nucleophilic organic molecule and the electrophile to generate at least an acid; and contacting a filtercake in the subterranean formation with the acid such that the acid degrades at least one acid-soluble component of the filtercake.

Statement 20. The method of statement 19, wherein the electrophile includes an acid halide such that the acidic species formed includes a strong acid.

To facilitate a better understanding of the present invention, the following examples of certain aspects of some embodiments are given. In no way should the following examples be read to limit, or define, the entire scope of the disclosure.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present embodiments are well adapted to attain the ends and advantages mentioned as well as those that are inherent therein. The particular embodiments disclosed above are illustrative only, as the present embodiments may be modified and practiced in different but equivalent manners apparent to those skilled in the art having the benefit of the teachings herein. Although individual embodiments are discussed, all combinations of each embodiment are contemplated and covered by the disclosure. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present disclosure.

What is claimed is:

1. A method of servicing a borehole comprising:
providing a borehole servicing fluid in a borehole penetrating a subterranean formation, wherein the borehole servicing fluid comprises a nucleophilic organic molecule and an electrophile; and wherein the borehole servicing fluid further comprises a non-aqueous fluid in an amount of about 50 wt. % to about 95 wt. % based on a total weight of the borehole servicing fluid;
reacting the nucleophilic organic molecule and the electrophile to generate at least an acidic species; and
contacting an acid-soluble component in the subterranean formation with the acidic species wherein the acidic species degrades the acid-soluble component.

2. The method of claim 1, wherein providing the borehole servicing fluid comprises pumping the borehole servicing fluid into the borehole.

3. The method of claim 1, wherein providing the borehole servicing fluid comprising combining a stream comprising the nucleophilic organic molecule and another stream comprising the electrophile to form the borehole servicing fluid.

4. The method of claim 1, wherein the acidic species comprises at least one strong acid selected from the group consisting of hydrochloride acid, hydrobromic acid, hydroiodic acid, and sulfuric acid.

5. The method of claim 1, wherein the nucleophilic organic molecule comprises at least one nucleophile selected from the group consisting of a simple alcohol, a mutual solvent, an amine, a thiol, a carboxylic acid, a phosphorous-based organic, and combinations thereof.

6. The method of claim 1, wherein the nucleophilic organic molecule comprises a mutual solvent.

7. The method of claim 6, wherein the mutual solvent comprises a glycol ether.

8. The method of claim 1, wherein the electrophile comprises an acid halide wherein the acidic species formed comprises a strong acid.

9. The method of claim 1, wherein the electrophile comprises an acid anhydride.

10. The method of claim 1, wherein the electrophile comprises an alkyl halide.

11. The method of claim 1, wherein the nucleophilic organic molecule comprises water.

12. The method of claim 1, wherein the electrophile comprises at least one alkylating agent selected from the group consisting of an acid anhydride, an acid chloride, an alkyl halide, and combinations thereof.

13. The method of claim 1, wherein the acidic species comprises a protonated intermediate that reacts with the acid-soluble component.

14. The method of claim 1, wherein the nucleophilic organic molecule, the electrophile, or both the nucleophilic organic molecule and the electrophile are modified to reduce reactivity with one another, wherein the modifying includes at least one modification selected from the group consisting of: incorporation of an electron withdrawing group in the nucleophilic organic molecule, incorporation of an electron donating group in the nucleophilic organic molecule, incorporation of an electron withdrawing group in the electrophile, incorporation of an electron donating group in the electrophile, and any combination thereof.

15. The method of claim 1, wherein either or both the nucleophilic organic molecule and the electrophile are sterically hindered with at least one R group having an A-value greater than about 1.76 kcal/mol.

16. The method of claim 1, wherein the acid-soluble component is a component of a filtercake, and wherein degradation of acid-soluble component removes at least a portion of the filtercake.

17. The method of claim 1, further comprising shutting in the borehole for a period of about 1 hour or longer while the acidic species is contacting the acid-soluble component.

18. A method of servicing a borehole comprising:
providing a borehole servicing fluid in a borehole penetrating a subterranean formation, wherein the borehole servicing fluid comprises a non-aqueous fluid, a nucleophilic organic molecule, and an electrophile,
wherein the non-aqueous fluid is present in an amount of about 50 wt. % to about 95 wt. % based on a total weight of the borehole servicing fluid; and
wherein the nucleophilic organic molecule comprises a mutual solvent;
reacting the nucleophilic organic molecule and the electrophile to generate at least an acid; and
contacting a filtercake in the subterranean formation with the acid wherein the acid degrades at least one acid-soluble component of the filtercake.

19. The method of claim 18, wherein the electrophile comprises an acid halide wherein the acidic species formed comprises a strong acid.

20. A method of servicing a borehole comprising:
providing a borehole servicing fluid in a borehole penetrating a subterranean formation, wherein the borehole servicing fluid comprises a nucleophilic organic molecule and an electrophile;
reacting the nucleophilic organic molecule and the electrophile to generate at least an acidic species wherein the acidic species comprises a protonated intermediate that reacts with the acid-soluble component; and
contacting an acid-soluble component in the subterranean formation with the acidic species wherein the acidic species degrades the acid-soluble component.

21. A method of servicing a borehole comprising:
providing a borehole servicing fluid in a borehole penetrating a subterranean formation, wherein the borehole servicing fluid comprises a nucleophilic organic molecule and an electrophile; and wherein the nucleophilic organic molecule, the electrophile, or both the nucleophilic organic molecule and the electrophile are modified to reduce reactivity with one another, wherein the modifying includes at least on modification selected from the group consisting of: incorporation of an electron withdrawing group in the nucleophilic organic molecule, incorporation of an electron donating group in the nucleophilic organic molecule, incorporation of an electron withdrawing group in the electrophile, incorporation of an electron donating group in the electrophile, and any combination thereof;
reacting the nucleophilic organic molecule and the electrophile to generate at least an acidic species; and
contacting an acid-soluble component in the subterranean formation with the acidic species wherein the acidic species degrades the acid-soluble component.

22. A method of servicing a borehole comprising:
providing a borehole servicing fluid in a borehole penetrating a subterranean formation, wherein the borehole servicing fluid comprises a nucleophilic organic molecule and an electrophile; and wherein either or both the nucleophilic organic molecule and the electrophile are sterically hindered with at least one R group having an A-value greater than about 1.76 kcal/mol;
reacting the nucleophilic organic molecule and the electrophile to generate at least an acidic species; and
contacting an acid-soluble component in the subterranean formation with the acidic species wherein the acidic species degrades the acid-soluble component.

* * * * *